United States Patent
Lebra

[11] 3,792,283
[45] Feb. 12, 1974

[54] DEVICE FOR CENTERING AN X-RAY FILM CASSETTE

[75] Inventor: Jacques Lebra, Colombes, France

[73] Assignee: U.S. Philips Corporation, New York, N.Y.

[22] Filed: Oct. 30, 1972

[21] Appl. No.: 302,112

[30] Foreign Application Priority Data
Nov. 18, 1971 France .............................. 71.41259

[52] U.S. Cl.................. 250/468, 250/471, 250/475
[51] Int. Cl. .......................................... H01j 37/22
[58] Field of Search ........ 250/66, 68, 468, 471, 475

[56] References Cited
FOREIGN PATENTS OR APPLICATIONS
66,780   5/1969   Germany ........................... 250/475

Primary Examiner—James W. Lawrence
Assistant Examiner—B. C. Anderson
Attorney, Agent, or Firm—Frank R. Trifari

[57] ABSTRACT

A device for centering the film cassette in an X-ray apparatus by means of two double systems of rods which together comprise four clamping members which can be symmetrically displaced towards the cassette, each of said rod systems being individually elastically coupled to a common operating member.

5 Claims, 3 Drawing Figures

DEVICE FOR CENTERING AN X-RAY FILM CASSETTE

The invention relates to a device for centering an X-ray film cassette with respect to a central point on a support table in an X-ray apparatus by means of two systems of rods; each of the systems comprises two clamping members which can be symmetrically displaced towards each other and between which the cassette can be clamped. The invention has for its object to provide such a device by means of which the complete centering of the cassette, namely the centering in two mutually perpendicular directions, can be performed by a single hand movement.

According to the invention the two systems of rods are operated by means of an operating member which can be locked in a number of positions and which is connected to each of the rod systems via separate springs. Each of the two clamping members of each rod system is preferably connected to one of two diametrically arranged points of a ring which is rotatable about the central point on which one of the springs acts approximately tangentially. The invention will be described in detail with reference to the Figures.

DESCRIPTION OF THE PREFERRED EMBODIMENT

Figure 1:
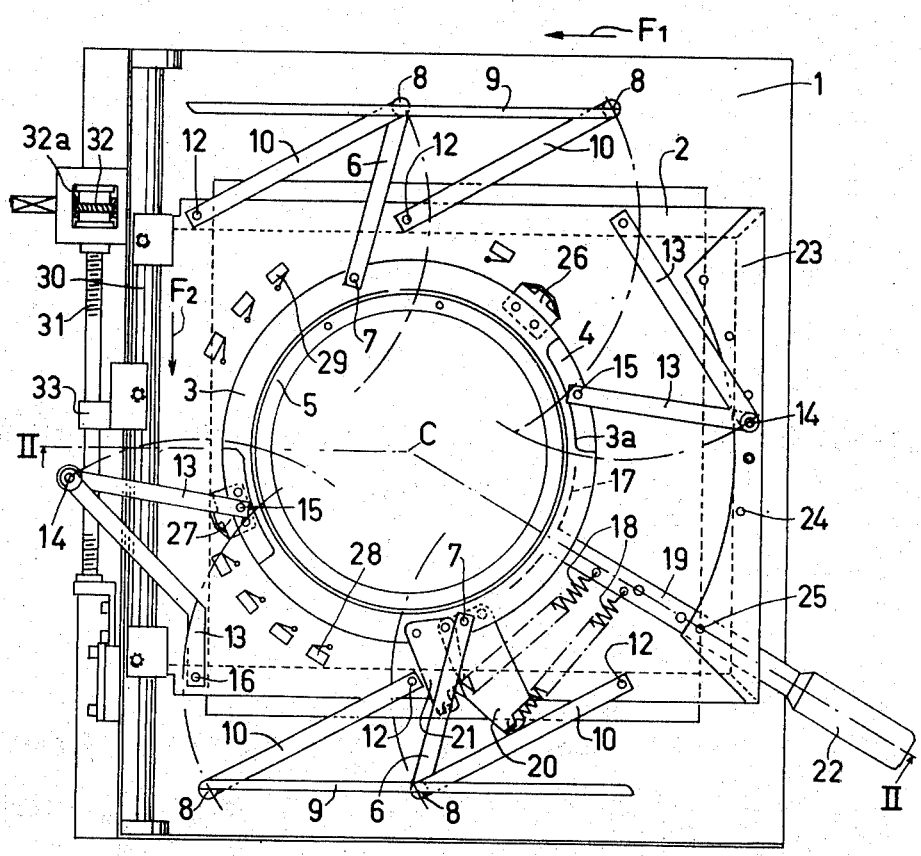
FIG. 1 is a plan view of a device according to the invention, from which the lid has been removed.

The device shown in FIG. 1 forms part of an X-ray apparatus and is mounted on a frame or chassis 1 on which a support table 2 is mounted to be displaceable in one direction. Provided on this table is an annular hub 5, about which two rings 3 and 4, arranged one above the other, are freely rotatable (in FIG. 1 only two parts of ring 4 are visible through diametrically arranged recesses 3a of ring 3).

Two pins 7 which are diametrically arranged on the ring 3 serve as pivots for two coupling rods or drive links 6 which form part of a rod system which is to be operated by means of the ring 3. This system of rods furthermore comprises two parallelograms linkages, each of which is composed of two rods 10, having pivots 8 and 12, and a clamping strip 9 which can be displaced parallel to itself. It will be obvious that the two clamping strips 9 can be moved towards each other in symmetry with respect to a central point C of the table 2 by counter-clockwise rotation of the ring 3.

The lower ring 4 operates, via two diametrically arranged pins 15, a secondary system of rods which is formed by two V-shaped rod pairs 13, each of which comprises a movable hinge pin 14 and a stationary hinge pin 16; the pins 14 or junctions are symmetrically displaced towards each other (according to the stroke-dot arcs) by counter-clockwise rotation of ring 4.

Provided between the two rings 3 and 4 is a third ring 17 which is rotatable about the hub 5 and which forms an integral part of an operating lever 19. The latter is elastically coupled, by means of two tensile springs 18 which act approximately tangentially on the rings 3 and 4, to two radial projections 20 and 21 of the rings 4 and 3, respectively. The lever 19 is provided with a grip 22 comprising a pin-like lock which cooperates with number of holes 24 in a locking plate 23.

Figure 2:
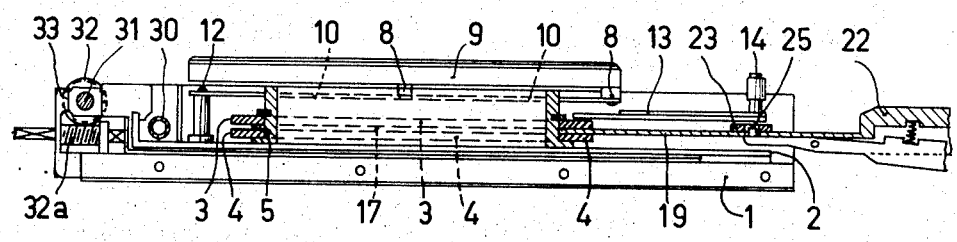
FIG. 2 is a partial sectional view taken on the segmented line II-II of FIG. 1.
Figure 3:
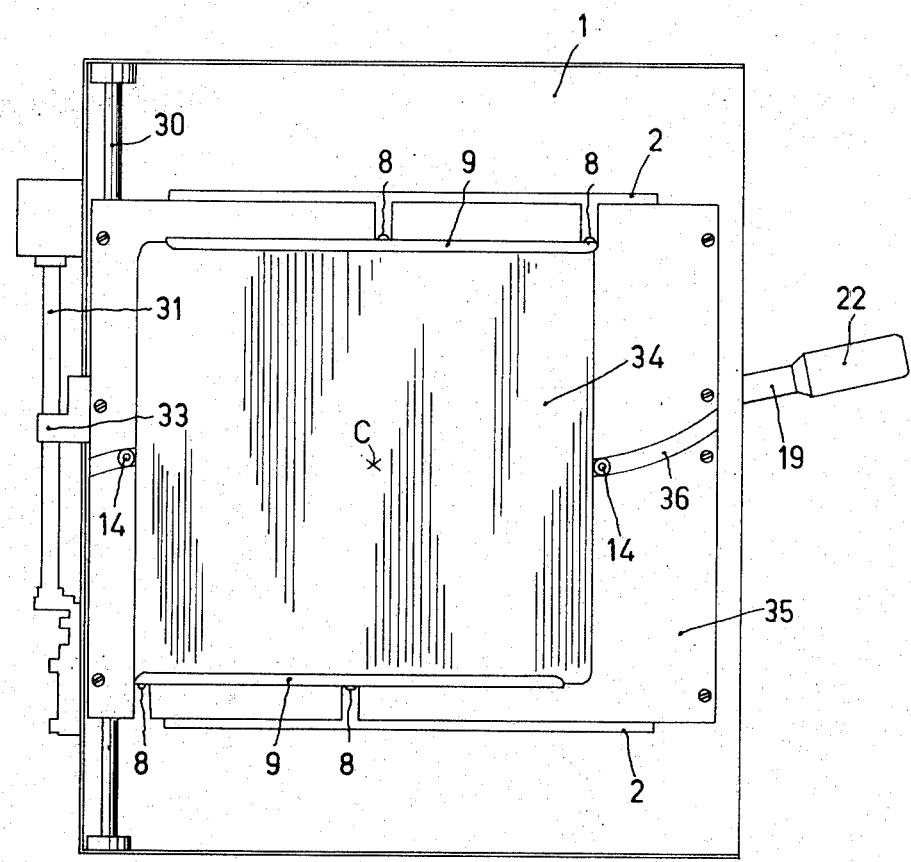
FIG. 3 is a plan view of the device with folded down lid on which the cassette is placed.

The support table 2 and the rod systems can be covered for the largest part by a lid or cover plate 35 (see FIG. 3) of an X-ray transparent material in which slots (for example, slot 36) are recessed to allow passage of the pins 8 and 14. An X-ray film cassette 34 of an arbitrary format can be placed on the plate 35. By moving the grip 22 upwards with respect to the position shown in FIG. 1, the clamping strips 9 and the pins 14 are symmetrically moved towards each other until they rest against the cassette 34 on all four sides (FIG. 3); with the result that the cassette is accurately centered with respect to the point C. Owing to the elastic connection between the lever 19 on the one side and the rings 3 and 4, respectively, on the other side, the centering can be performed by a single movement of the lever for any cassette format. After the lever 22 has been locked by means of the locking pin 25, the cassette is fixed on the support table 2 in the centered position; the cassette can be released only after the lever 19 has been released by compression of the grip 22 (see FIG. 2).

The described device can be used for making single X-ray recordings, possibly after a preliminary observation of the object through the hollow hub 5 by means of an X-ray image intensifier. It is alternatively possible to make a number of recordings per film, for which purpose the cassette must be displaced in known manner after each exposure. For this purpose known transport devices (not shown) can be provided for displacement of the chassis 1 in the direction of the arrow F1 and of the support table 2 with respect to the chassis 1 in the direction of the arrow F2. The chassis 1 can be provided, for example, with a guide rod 30 along which the table 2 can be displaced by means of a nut 33 on a transport screw 31 which can be driven via a system of mutually perpendicular gearwheels 32 and 32a which are provided with inclined teeth, the gearwheel 32a being freely slidable over its square drive shaft. The motors (not shown) which drive the support plates 1 and 2 can be controlled via suitable computers which receive signals from microswitches 28 which are arranged along the rings 3 and 4 and which are operated by radial projections 26 and 27 of the rings 3 and 4; these projections are arranged at locations which are representative for the most commonly used cassette formats, and can thus inform the computer about the format of the inserted cassette.

What is claimed is:

1. Apparatus for centering an X-ray cassette with respect to a central point on a support table thereof, comprising first and second rings mounted on said table for rotation about said point, two four-bar parallelogram linkages, each comprising one pair of parallel rods having near and remote ends, a clamp member pivotally secured to said remote ends, and the near ends pivotally secured to said support table, the two linkages positioned such that said clamp members are mutually parallel and on opposite sides of said point, a drive link connecting each linkage to said first ring, a pair of 2-bar linkages, such comprising a first arm having a first end pivotally secured to said table and a far end, and a second arm having a first end pivotally secured to said second ring and a far end, said far ends pivotally secured together in a junction, said 2-bar linkages positioned such that the two junctions are on opposite sides of said point and define a line between them generally parallel to and midway of said parallel clamping members, an actuating lever pivotally mounted to said apparatus, and resilient means connecting said lever to said rings whereby movement of said lever in one direction resiliently urges said rings to rotate in a corresponding direction, and thereby move said clamping members and junctions symmetrically toward said point, and vice versa.

2. Apparatus according to claim 1 further comprising a hub on said table formed as a round cylindrical post, with said rings situated rotatably about said hub.

3. Apparatus according to claim 1 further comprising means for locking said lever in a selected position.

4. Apparatus according to claim 1 wherein said clamp members and junctions respectively have a distance apart corresponding to the degrees of rotation of said rings, the apparatus further comprising at least one switch on said table and at least one switch actuator rotatable with said rings, drive means for displacing said table laterally, whereby sufficient rotation of said rings for said switch actuator to contact and activate said switch, and thereby activate said drive means for displacing said table.

5. Apparatus for centering an X-ray film cassette with respect to a central point on a support table thereof, comprising a first member mounted on said table for rotation about a point on said table, a second member mounted similarly as the first member for rotation about the same point, a pair of linkages each defining a parallelogram of four links consisting of a first link fixed relative to said table, a second link being a clamping member spaced from the first link, and two parallel links pivotally connecting the first and second links, these linkages positioned such that said clamping members are parallel, spaced spart about said point, and movable symmetrically toward and away each other, first means connecting said first member and said two linkages, whereby rotation of the first means causes said movement of said clamping members, a pair of secondary linkages, each comprising a first bar having one end pivotally secured to said table and a far end, and a second bar having one end pivotally secured to said second member and a far end, with said far ends pivotally secured together at a junction, said junctions being spaced apart symmetrically about said point and movable toward and away from each other, a lever pivotally mounted to said apparatus, and resilient means interconnecting said lever and said first and second members, whereby movement of the lever in one direction resiliently urges said members to rotate about said point in a corresponding direction, and thereby causes said clamping members and junctions to move symmetrically as defined.

* * * * *